United States Patent
Dykstra

(12) 
(10) Patent No.: US 9,775,334 B2
(45) Date of Patent: *Oct. 3, 2017

(54) INSECT TRAP WITH REFLECTIVE INTERIOR WALLS

(71) Applicant: Technology S.G., LP, West Conshocken, PA (US)

(72) Inventor: Thomas M. Dykstra, Gainesville, FL (US)

(73) Assignee: TECHNOLOGY S.G., LP, West Conshohocken, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/529,584

(22) Filed: Oct. 31, 2014

(65) Prior Publication Data

US 2015/0150233 A1    Jun. 4, 2015

Related U.S. Application Data

(63) Continuation of application No. 10/354,067, filed on Jan. 30, 2003, now Pat. No. 8,893,428.

(Continued)

(51) Int. Cl.
*A01M 1/02* (2006.01)
*A01M 1/10* (2006.01)
(Continued)

(52) U.S. Cl.
CPC ............. *A01M 1/145* (2013.01); *A01M 1/02* (2013.01); *A01M 1/023* (2013.01); *A01M 1/10* (2013.01); *A01M 1/14* (2013.01); *A01M 1/226* (2013.01)

(58) Field of Classification Search
CPC .......... A01M 1/02; A01M 1/106; A01M 1/14; A01M 1/10; A01M 1/145; A01M 1/04;
(Continued)

(56) References Cited

U.S. PATENT DOCUMENTS

| 524,437 A | 8/1894 | Hayden |
| 1,249,753 A | 12/1917 | Higgins |

(Continued)

FOREIGN PATENT DOCUMENTS

WO    WO 98/10643    3/1998

OTHER PUBLICATIONS

Becker, G., "Communication between Termites by Means of Biofields and the Influence of Macnetic and Electric Fields on Termites," in Popp, F.A. et al. (eds)., Electromagnetic Bio-Information, Urban & Schwarzenberg, pp. 116-127 (1989).

(Continued)

*Primary Examiner* — Brooke Purinton
(74) *Attorney, Agent, or Firm* — Sterne, Kessler, Goldstein & Fox P.L.L.C.

(57) ABSTRACT

A system and method are provided to control the amplification of natural frequencies emanating from molecules, specifically insect sex pheromones. The pheromone molecules are deposited in a resonant cavity that allows the generation of coherent and/or semi-coherent radiation. The molecular emissions are amplified in the resonant cavity and allowed to escape through a small circular opening on top of the resonant cavity. The molecules and/or their emissions dissipate into the surroundings to attract insects towards the cavity. When the insect enters the resonant cavity, a trap door prevents the insect from exiting. The molecular emissions are produced by passive diffusion and passive amplification because no pumping radiation source is required. However pumping radiation can be integrated to assist the passive amplification or serve as a second attractant.

20 Claims, 5 Drawing Sheets

Related U.S. Application Data

(60) Provisional application No. 60/354,946, filed on Feb. 11, 2002.

(51) Int. Cl.
*A01M 1/14* (2006.01)
*A01M 1/22* (2006.01)

(58) Field of Classification Search
CPC ...... A01M 29/34; A01M 99/00; A01M 29/12; A01M 1/00
USPC .......................................... 43/122, 136, 133
See application file for complete search history.

(56) References Cited

U.S. PATENT DOCUMENTS

| | | | |
|---|---|---|---|
| 1,701,674 A * | 2/1929 | Hitosi | A01M 1/04 43/111 |
| 3,653,145 A | 4/1972 | Stout | |
| 3,666,169 A | 5/1972 | Eaton | |
| 3,708,908 A | 1/1973 | Levey | |
| 3,947,985 A | 4/1976 | Skryzpczak | |
| 3,997,785 A | 12/1976 | Callahan | |
| 4,089,132 A | 5/1978 | McLaughlin | |
| 4,121,372 A * | 10/1978 | Landaus | A01M 1/02 43/122 |
| 4,168,591 A * | 9/1979 | Shaw | A01M 1/023 43/114 |
| 4,282,673 A | 8/1981 | Focks et al. | |
| 4,400,903 A | 8/1983 | Seidenberger | |
| 4,440,321 A | 4/1984 | Campbell et al. | |
| 4,472,904 A | 9/1984 | Wasielewski | |
| 4,505,065 A | 3/1985 | Niemeyer | |
| 4,577,434 A * | 3/1986 | Davis | A01M 1/145 43/114 |
| 4,606,768 A | 8/1986 | Svilar et al. | |
| 4,669,237 A | 6/1987 | Constantine | |
| 4,998,376 A | 3/1991 | Scherjbak | |
| 5,050,336 A | 9/1991 | Paassen | |
| 5,133,150 A | 7/1992 | Briese | |
| 5,247,933 A | 9/1993 | Callahan et al. | |
| 5,323,556 A | 6/1994 | Carle | |
| 5,325,272 A * | 6/1994 | Miller | F21S 8/037 362/238 |
| 5,365,690 A | 11/1994 | Nelson et al. | |
| 5,424,551 A | 6/1995 | Callahan | |
| 5,449,376 A | 9/1995 | Callahan | |
| 5,505,017 A | 4/1996 | Nelson et al. | |
| 5,528,049 A | 6/1996 | Callahan | |
| 5,532,681 A * | 7/1996 | Peters et al. | 340/573.1 |
| 5,540,011 A * | 7/1996 | Groom | A01M 1/023 43/107 |
| 5,557,341 A | 9/1996 | Weiss et al. | |
| 5,572,825 A | 11/1996 | Gehret | |
| 5,622,617 A | 4/1997 | Tsusaka et al. | |
| 5,766,617 A | 6/1998 | Heath et al. | |
| 5,896,695 A | 4/1999 | Walker | |
| 5,915,948 A | 6/1999 | Kunze et al. | |
| 5,921,018 A | 7/1999 | Hirose et al. | |
| 5,974,726 A | 11/1999 | Creeger et al. | |
| 5,974,727 A | 11/1999 | Gilbert | |
| 6,112,452 A | 9/2000 | Campbell | |
| 6,158,165 A * | 12/2000 | Wilson | A01M 1/02 43/100 |
| 6,209,256 B1 * | 4/2001 | Brittin et al. | 43/107 |
| 6,301,827 B1 | 10/2001 | Lankster | |
| 6,327,810 B1 * | 12/2001 | Howse | A01M 1/02 43/107 |
| 6,401,384 B1 | 6/2002 | Contadini et al. | |
| 6,493,986 B1 * | 12/2002 | Nelson | A01M 1/145 43/113 |
| 6,502,347 B1 * | 1/2003 | Carver, Sr. | 43/113 |
| 6,516,558 B1 | 2/2003 | Lingren et al. | |
| 6,546,667 B1 | 4/2003 | Carter | |
| 6,662,464 B2 | 12/2003 | Treu | |
| 6,708,443 B2 | 3/2004 | Hall | |
| 6,722,080 B2 | 4/2004 | Carter | |
| 6,871,443 B2 | 3/2005 | Lambert et al. | |
| 6,959,510 B1 | 11/2005 | Nelson et al. | |
| 7,024,815 B1 * | 4/2006 | Visagie | 43/113 |
| 7,086,569 B2 | 8/2006 | Stravitz | |
| 2001/0042337 A1 | 11/2001 | Lambert et al. | |
| 2002/0011020 A1 * | 1/2002 | Nelson et al. | 43/107 |
| 2002/0032980 A1 | 3/2002 | Nelson | |
| 2003/0089023 A1 | 5/2003 | Nelson et al. | |
| 2003/0151006 A1 | 8/2003 | Dykstra | |
| 2003/0154644 A1 | 8/2003 | Lambert et al. | |
| 2006/0218851 A1 | 10/2006 | Weiss et al. | |
| 2007/0068068 A1 | 3/2007 | Weiss et al. | |

OTHER PUBLICATIONS

Blomquist, G.J. and Vogt, R.G. (eds), Insect Pheromone Biochemistry and Molecular Biology, pp. 393, 396, 501, 517, and 594 (2003).

Bruce, W.A., "Perception of Infrared Radiation by the Spiny Rat Mite *Laelaps echidnia* (Acari: Laelapidae)," Annals of the Entomological Society of America, pp. 925-931 (1971).

Callahan, P.S. "Far Infrared Stimulation of Insects with the Glagolewa-Arkadiewa 'Mass Radiator'," The Florida Entomologist, vol. 54, No. 2, pp. 201-204 (1971).

Callahan, P.S. et al., "Attraction of Ants to Narrow-Band (Maser-like) Far-Infrared Radiation as Evidence for an Insect Infrared Communication System," Physiol. Chem. & Physics 14, pp. 139-144 (1982).

Search Report for International Application No. PCT/US03/04104, dated Jul. 17, 2003.

Doolittle et al., "A Low Cost, NIST-Traceable, High-Performance Dielectric Resonator Master Oscillator", Proc. 1999 Particle Accelerator Conf., NY 1999, pp. 7687770.

E.-K. Souw, "Plasma density measurement in an imperfect microwave cavity", J. Appl. Phys. 61 (5) 1987, pp. 1761-1772.

Evans, W.G., "Morphology of the Infrared Sense Organs of Melanophilia Acuminata (Buprestiae: Coleoptera)," Annals of the Entomological Society of America, vol. 59, No. 5, pp. 873-877 (1966).

Evans, W.G., "Perception of Infrared Radiation from Forest Fires by Melanophila Acuminata De Geer (Buprestidae, Coleoptera)," Ecology, vol. 47, No. 6, pp. 1061-1065 (1966).

Goldwasser, S.M., Sam's Laser FAQ—Helium-Neon Lasers, from http://www.laserfaq.org/slf/laserhen.htm (retrieved on Mar. 18, 2004), 127 pages, (Copyright 1994-2003).

J. W. Goodman (1958), "Statistical Optics", J. Wiley & Sons, New York, etc.

Ji et al., "A High-Q Millimeter-Wave Dielectric-Resonator Bandpass Filter Using Whispering-Gallery Modes," TMO progress Report 42-141, May 15, 2000, pp. 1-11.

Krupa et al., "A dialectic resonator for measurements of complexity of low loss dialectic materials as function of temperature", Meas. Sci. Technol. 9 (1998). 1751-1756.

Leal et al, "Identification, Synthesis, and Field Evaluation of the Sex Pheromone of the Citrus Fruit Borer" J. Che. Ecology 27 (10), 2001, pp. 2041-2051.

Mompart et al., "Lasing without inversion", J. Opt. B.: Quantum Semiclass. Opt. 2, 2000, R7-R24.

Neuroscience/LifeScience/Neuroinfomatics, "Data Analysis and Statistics Tutorial", http://www.dns.ed.ac.uk/~rrr?MscNeuroStats2002.htm.

Popp, F.A., "Coherent Photon Storage of Biological Systems," in Popp, F.A. et al. (eds.), Electromagnetic Bio-Information, pp. 144-167 (1989).

E.-K. Souw, Plasma density measurement in an imperfect microwave cavity, J. Appl. Phys. 61 (5) 1987, pp. 1761-1772.

Trbojevic et al., "Resonant cavity enhanced photodetectors for LWIR atmospheric window: Resonator Design," X Telecom Forum Telfor'2002, Belgrade, Nov. 26-28, 2002, pp. 1-4.

(56) References Cited

OTHER PUBLICATIONS

Tunable Diode Laser Absorption Spectroscopy, http://www.asp.ucar.edu/colloquium/1992/notes/part2/note9.html.
Universita degli Studi di Pavia, Centro Inderdisciplinare di Bioacustica e Ricerche Ambienali, "Insects—Sound produced by insects" [online], [retrieved on Nov. 13, 2001]. Retrieved from the Internet: <URL: http://www.unipv.it/cibra/insec.html> (6 pages).
University of Yale, "Confidence Intervals", http://stat.yale.edu/Courses/1997-1998/101/confint.htm.
Warnke, U., "Information Transition by Means of Electrical Biofields," in Popp, F.A. et al. (eds.), Electromagnetic Bio-Information, pp. 74-101 (1989).

* cited by examiner

INSECT TRAP WITH REFLECTIVE INTERIOR WALLS

CROSS-REFERENCE TO RELATED APPLICATIONS

This application is a continuation of U.S. patent application Ser. No. 10/354,067, filed on Jan. 30, 2003, now issued as U.S. Pat. No. 8,893,428, which claims benefit to U.S. Provisional Application No. 60/354,946, filed Feb. 11, 2002, all of which are incorporated by reference in their entirety.

BACKGROUND

Field of the Invention

The present invention is directed to controlling electromagnetic emissions. More particularly, the present invention relates to the stimulation of electromagnetic emissions to control pest populations.

Background Art

Stored grain is transported all over the world by ship, truck, and plane. The distribution of grain is dependent on short to long-term storage ranging from a few days to more than a year. The long-term storage of grain has encouraged the exponential growth of many insects and other pests that infest stored grain. Augmentation of pest populations are facilitated by the virtually unlimited food source found in storage grain bins or warehouses. Estimated losses caused by pests in temperate climates approximates 10-15%, but in tropical countries, the figure can be as high as 60%.

In less severe cases, healthy insect infestations, while not directly consuming the grain in bulk, greatly reduce grain marketability simply by their presence. Insect body parts or residues that can be found in storage grain samples thus create financial hardship for many farmers. On a national scale, this monetary figure runs into the hundreds of millions of dollars.

Farmers and industry have turned to chemical management in an effort to reduce the pest populations found in stored grain. The chemicals are either sprayed directly on the grain as it is being placed into the storage grain bin or warehouse storage area, or the same may be fumigated with a registered fumigant once the grain is placed in semi-permanent storage. The fumigant of choice for many years has been methyl bromide. However, methyl bromide is being phased out to comply with environmental regulations. Replacements for methyl bromide nonetheless are currently chemical in nature.

Several problems are associated with the chemical management of pest infested stored grains. These problems include chemical residues being left on grain destined for human or animal consumption, accidental human exposure to fumigants resulting in death or sickness, corrosive damage to sensitive equipment such as computers, and the potentially high financial costs of fumigation, most especially at ports. These are serious problems that all present and future fumigation companies must address.

An alternative to chemical management is the use of insect traps that contain naturally attractive molecules called pheromones. Typically, these molecules are released into the atmosphere by individual insects and are used by insects to locate a mate. For this reason, these particular molecules are called insect sex pheromones. When pheromones were first synthetically produced in the 1960s, many believed they would solve pest management problems since sex pheromones were considered to provide an irresistible and highly specific attractant to many of the most common insect pests.

Unfortunately, the sex pheromone traps did not meet their expectations. Because they attract so few insects, these traps have been downgraded from insect management devices to merely insect monitoring devices.

Current sex pheromone traps have many limitations. One limitation includes the relatively small number of insects trapped over a given period of time. There are no reliable figures to specify the percentage of insects that can be successively trapped in a given area. However, years of research wholly supports that the traps are ineffective at significantly reducing insect populations in a storage grain bin or warehouse unless the traps are used in very high densities.

A second limitation is the reduced longevity of the pheromone source or lure in conventional traps. The longevity of the pheromone lure is estimated to be approximately six weeks based on anecdotal information in the industry. A third limitation involves the mechanism used by these pheromone traps to capture and retain the insects. A sticky card is a common mechanism used to hold and retain the insects once they enter the pheromone trap. However since pheromone traps are often placed in dusty environments, a sticky card can become useless after only a few days, which is unfortunately long before the pheromone lure will lose its effectiveness.

An exemplary insect trap is described in U.S. Pat. No. 3,997,785 to Callahan (herein referred to as the '785 patent), which is incorporated herein by reference as though set forth in its entirety. This trap functions by vibrating a gold coated needle in a molecular scent vapor. Although it provides advantages over other conventional solutions, this trap did not perfectly mimic the frequencies produced by the target insect. Improvements were made and described in U.S. Pat. No. 5,424,551 to Callahan (herein referred to as the '551 patent), which is incorporated herein by reference as though set forth in its entirety. Despite the advantages this trap has over other conventional solutions, this trap has been determined to attract insects at a distance of only four to five centimeters.

Consequently, a system and method are needed to solve the above-identified problems and provide an efficient solution for controlling insects and other pests without the harmful side-effects of chemical management.

BRIEF SUMMARY

The system and method of present invention overcome the problems of conventional pest control systems by providing a partially enclosed, resonant cavity that naturally attracts and traps pest populations.

One or more target lures are introduced into a reflective resonant cavity. In an embodiment, the target lure is a substrate that has been impregnated with a particular semiochemical (e.g., insect sex pheromones). The lure is positioned inside of the cavity. Within the cavity, the semiochemical disperses into the local atmosphere and releases coherent and/or semi-coherent electromagnetic radiation.

The resonant cavity is substantially closed to prevent easy escape of the semiochemical or the radiation emitted from the semiochemical. The radiation is permitted to propagate within the resonant cavity and create a cascading effect. The present invention operates without the need of pumping radiation or active air flow. Therefore, the semiochemical passively diffuses and its radiation passively amplifies at a natural rate. The passive amplification also causes the semiochemical molecules to vibrate until they enter into a higher activity state. Eventually, the passive diffusion allows the highly active semiochemical and/or its radiation to escape through a small aperture to attract and trap the target pest.

In an embodiment, parallel reflecting plates are provided to passively amplify the radiation. As described, pumping radiation is not required to amplify or modulate the radiation. To achieve passive amplification, the target lure allows for the escape of its impregnated semiochemical molecules into the resonant cavity for a certain period of time which is referred to as the incubation period. Thus, the resonant cavity is substantially closed to allow the semiochemical to remain inside the resonant cavity during its incubation period. This action allows the concentration of the semiochemical to increase and reach a critical level. Upon reaching the critical level, the semiochemical and its radiation passively escapes from the trap.

In another embodiment, a source of pumping radiation is provided as an additional attractant. Additionally or alternatively, the pumping radiation can be situated to enhance the passive amplification. However the present invention is functional in absence of pumping radiation.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

DETAILED DESCRIPTION

Figure 1:
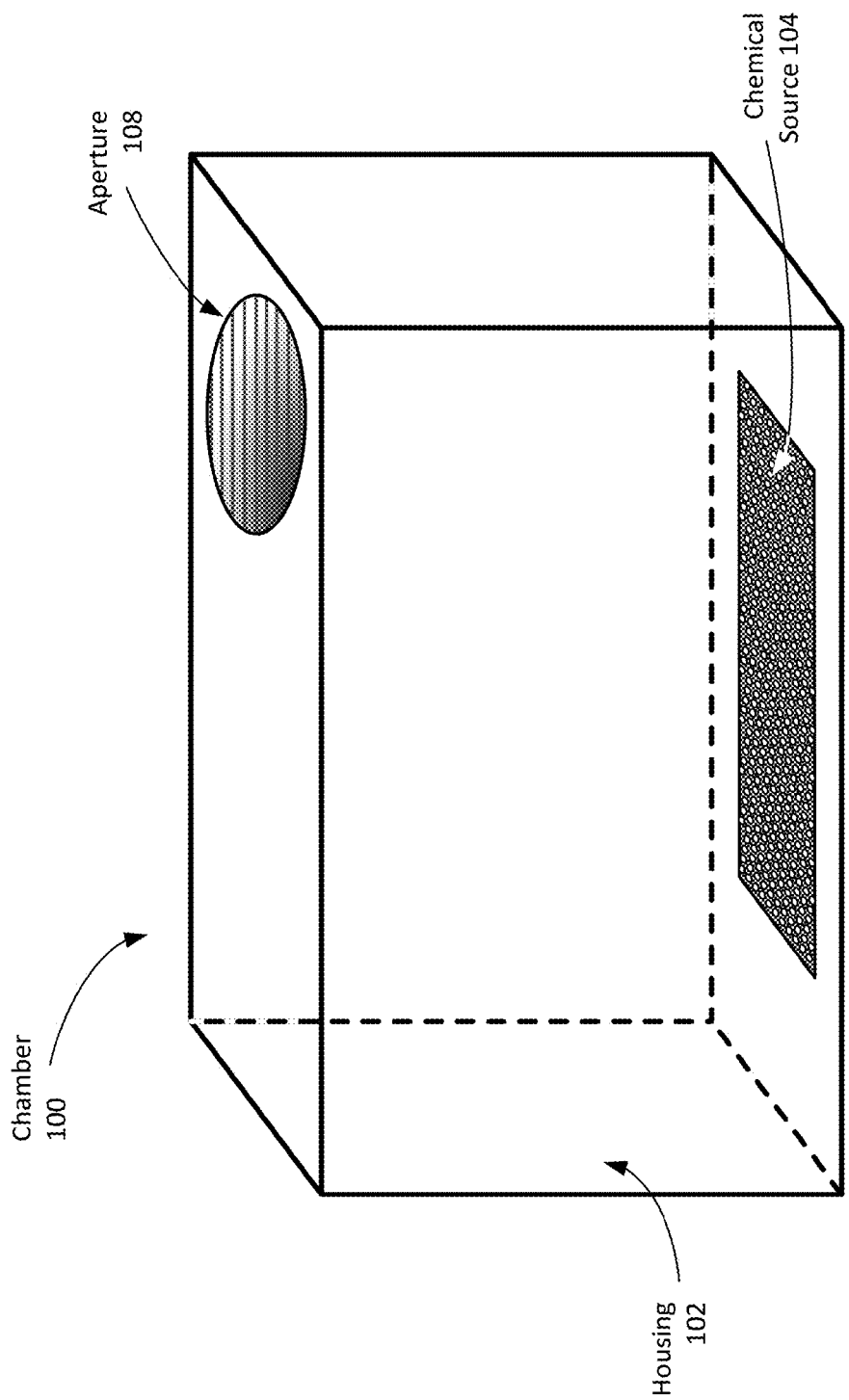
FIG. 1 illustrates a pest control chamber according to an embodiment of the present invention.

The present invention provides a method and system for attracting and trapping various pests without the use of harmful pesticides and similar chemicals. Alternatively, the present invention can be used to repel pests. The present invention is premised on the concept that olfaction in animals (for example, insects) is based on electromagnetic signals emanating from molecules.

The prevalent theory regarding olfaction is the "lock and key hypothesis." This hypothesis is taught in virtually all high schools and universities, and states that a given molecule fits into a biological receptor. This binding to the receptor can be either permanent or semi-permanent in nature. Once the molecule binds with the receptor, a nervous impulse propagates down the axonal region of a neuron, if not several neurons, where the impulse is eventually received by an appropriate decoder, such as the brain.

An alternative hypothesis concerning olfaction, specifically in insects, has been presented in a series of papers published by both Robert H. Wright and Philip S. Callahan. Working independently, they began publishing their ideas in the 1950s. Their hypotheses, although not identical, suggest olfaction is based on electromagnetic signals emanating from molecules. They suggest that the electromagnetic signature of molecular emissions causes an olfactory response in insects. Based on this hypothesis, the manipulation of molecular emissions will theoretically affect olfaction. It is the manipulation of electromagnetic frequencies that differentiates the present invention from conventional insect traps presently on the market. Moreover, the present invention also provides a more effective trap for capturing insects than offered by conventional insect traps.

The present invention uses a partially enclosed cavity to naturally amplify electromagnetic radiation emitted from molecules diffusing from a target lure. The partially enclosed cavity of the present invention is similar to the systems of the '785 patent and the '551 patent. However, these systems describe a contained system, or perfectly sealed cavity for amplifying emissions from target molecules, such as insect sex pheromones. Other important distinctions exist between the present invention and these former patents, and these distinctions are discussed in greater detail below.

In an embodiment, the target lure contains one or more semiochemicals that attract the target pest. Conventionally, a semiochemical includes any secretory substance that regulates behavior in members of the same or different species. A semiochemical can be a pheromone, such as an insect sex pheromone, that solicits a certain reaction among members of the same species. However, the present invention includes other substances that can be used in lieu of, or in combination with, a semiochemical to attract a target pest. These substances include, but are not limited to, garlic scent, perfume, deodorant, air freshener, similar molecules, infrared coded emissions from any system that controls or effects living organisms (such as, drugs, pharmaceuticals, etc.), or the like. Depending on whether the present invention is being used as an attractant or repellant, the target lure can also contain one or more semiochemicals or other substances that repel the target pest. Hence, as used herein, the term "semiochemical" refers to conventional semiochemicals, other substances as mentioned above, or both.

In the present invention, the ambient conditions are sufficient to permit the target lure to naturally disperse its semiochemical within the partially enclosed cavity, and release electromagnetic radiation. As the electromagnetic radiation propagates within the cavity, it increases the activity level of the molecules, ions, or atoms comprising the semiochemical, and produces a cascading effect by amplifying stimulated emissions from the semiochemical. It is this heightened physical activity level which results in the increased biological attraction exhibited from the target pests. The present invention allows a sufficient degree of amplification which is more similar to that found under natural conditions. The amplified electromagnetic radiation and/or the more highly active semiochemical is allowed to passively escape from the cavity. Therefore, the present invention passively promotes the amplification of coherent and/or semi-coherent emissions into the surrounding environment. Eventually targeted pests are lured into the cavity where they become permanently trapped.

FIG. 1 illustrates a pest control chamber 100 according to an embodiment of the present invention. Chamber 100 is configured to provide a resonate cavity that facilitates the natural production of coherent and/or semi-coherent electromagnetic radiation. The radiation is released into the atmosphere via highly active semiochemicals at a frequency level that serves as an attractant or repellant to insects or like pests, depending on the selected semiochemical(s).

Chamber 100 includes a housing 102, a chemical source 104, and an aperture 108. The surrounding housing 102 can be produced from a variety of natural or synthetic materials, including metals, non-metals, and/or alloys. In an embodiment, housing 102 consists of a wood product. In another embodiment, housing 102 is produced from granite, quartz, or other forms of rock. For example, housing 102 can be a smooth laminated and/or polished granite surface. Other suitable materials can be plastic, cardboard, and glass. Housing 102 can be any suitable material or combination of materials as long as the material is capable of preventing the semiochemical, or electromagnetic radiation from the semiochemical, from penetrating the walls of housing 102.

Housing 102 is shaped as a parallelogram, having a top, bottom, and four sides. However, housing 102 is not restricted to a parallelogram or other straight sided shapes. Housing 102 can form any type of geometric shape, including without limitation, cylindrical, spherical, parabolical, and/or conical shapes, a combination of various shapes, and the like.

Chemical source 104 and aperture 108 are strategically located to produce a desired control signal that is released from aperture 108. As discussed, the control signal can be either the semiochemical in an amplified activity state, radiation from the semiochemical, or both. Chemical source 104 represents the target lure. In an embodiment, chemical source 104 is a substrate having a semiochemical applied to the substrate surface. In another embodiment, chemical source 104 is a plurality of substrates having a semiochemical deposited onto each substrate. Each substrate can use the same or a different semiochemical. Different types of semiochemicals can be used to either increase the likelihood of attracting a particular pest, or enable chamber 100 to be effective in attracting a variety of pests.

In another embodiment of chemical source 104, the semiochemical is applied directly to the inner surface of housing 102, instead of being deposited onto a substrate. In another embodiment, chemical source 104 is an external unit connected to an opening or vent formed within housing 102. The semiochemical is stored in the external unit, and dispersed through the opening or vent into chamber 100. Other mechanisms, methodologies, and techniques can be employed to introduce semiochemicals into chamber 100, and are deemed to be within the scope of the present invention.

Within chamber 100, the semiochemical disperses from chemical source 104 and releases electromagnetic radiation. The radiation from one molecule (or, atom or ion, depending on the selected semiochemical) stimulates emissions from other molecules and produces coherent and/or semi-coherent frequencies. Passive amplification is achieved as the emissions resonate by traveling back and forth within chamber 100, and produce additional stimulated emissions which eventually create a cascading effect. Unlike the systems described in the '785 patent and the '551 patent, air flow or pumping radiation is not required to amplify stimulated emissions. In the present invention, the semiochemical is not at first directly exposed to the atmosphere or its wind currents. For this reason, the longevity of the semiochemical in chamber 100 is much greater than it would be in conventional insect pheromone traps. Laboratory research by the inventor reveals that an insect pheromone lure in the present invention remains effective for at least one and a half years, which is up to fourteen times longer than the effective life of a pheromone lure in a conventional insect pheromone trap.

Once dispersed, the semiochemical remains inside and resonates within chamber 100 for a certain period of time, referred to as the incubation period. Upon conclusion of the incubation period, the control signal (i.e., amplified semiochemical, radiation emitted from the semiochemical, or both) passively diffuses through aperture 108. In an embodiment, aperture 108 is a circular opening in the top side of housing 102. The diameter of aperture 108 is one-quarter inch, but may be varied to adjust for the size of the pest, and/or modulate semiochemical concentration, target frequencies, or the like. Although aperture 108 is illustrated as being circular, aperture 108 can form other geometric shapes, or can be located at other positions, such as the side of chamber 100, so long as the control signal is allowed to escape into the surrounding environment.

The incubation period for the semiochemical is sufficient to produce a desired concentration level and/or target frequency of amplified coherent and/or semi-coherent emissions. This time period is achieved by substantially enclosing chamber 100 to produce the resonant cavity, thus preventing the easy escape of the semiochemical. As shown in FIG. 1, chamber 100 is almost completely enclosed except for the opening provided by aperture 108. In other embodiments, the shape and walls of chamber 100 can be structured to provide more openings so long as the semiochemical is allowed to remain inside for the incubation period.

Accordingly, various factors influence the requisite incubation period. The incubation period is a function of the shape, volume, surface area, or dimensional characteristics of chamber 100. The incubation can be influenced by the material used to form housing 100. The incubation period can also vary due to the size, shape, location, or quantity of openings, including aperture 108, as well as the permeability of aperture 108, discussed in greater details below.

Figure 2:
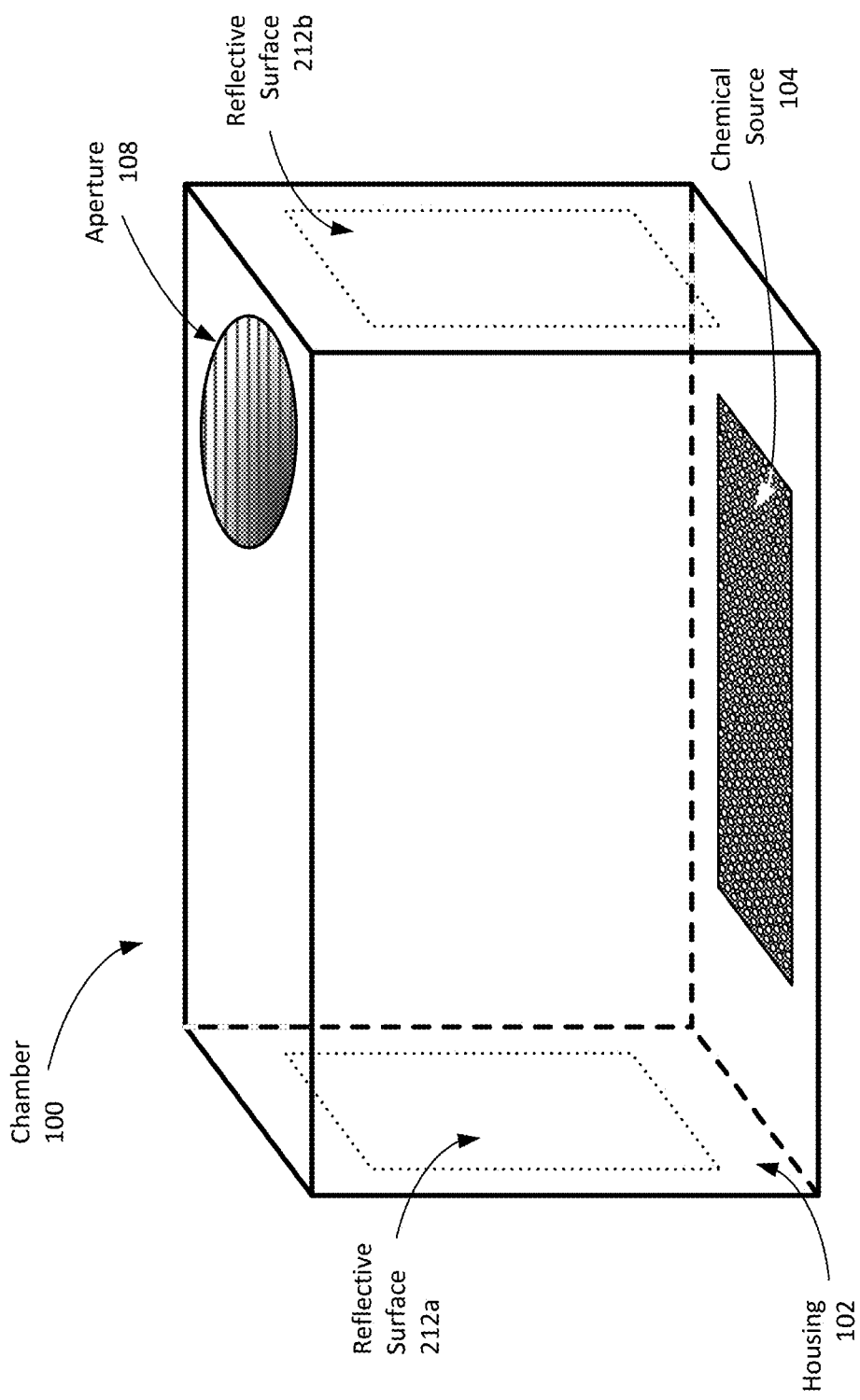
FIG. 2 illustrates a pest control chamber according to another embodiment of the present invention.

The present invention does not use wind currents as described for the systems of the '785 patent and the '551 patent. As such, the semiochemical and its electromagnetic radiation are obligated to remain in the resonant cavity, and can therefore only escape via passive diffusion. Although an active wind response can be created by, for example, one or more moths fluttering their wings once trapped inside the resonant cavity, this wind response is not dependent on any inherent or active properties of chamber 100, itself. At an appropriate time, the control signal, representing the amplified semiochemical and/or its amplified coherent and/or semi-coherent emissions, emanates from aperture 108 into the surrounding environment. Upon making contact with the control signal, each target pest follows the concentration gradient of the control signal to its source.

Chamber 100 can be tuned to different pests, and serves as an attractant or repellant, depending on the objectives of the user. This can be achieved by changing the type of semiochemical or increasing the concentration or density of the semiochemical dispersed within chamber 100. Chamber 100 can also be tuned by altering the shape and/or dimensions of housing 102. Additionally, the incubation period can be adjusted to set the desired amplification of the target electromagnetic frequencies. As discussed above, the dimensions of aperture 108 or chamber 100 can be varied to alter the desired concentration levels or frequencies.

As described above, passive amplification is achieved by electromagnetic emissions naturally resonating within chamber 100. Various resonating mechanisms can be provided to promote this activity. In FIG. 1, electromagnetic radiation propagates between the walls of housing 102. FIG. 2 provides another embodiment of chamber 100 that includes two parallel reflective surfaces 212a-212b. Reflective surfaces 212a-212b promote natural resonance between these parallel components, and produces a cascading effect of emissions in same wavelength and phase. Reflective surfaces 212a-212b can be a mirror or like material that prevents the radiation from penetrating the components and escaping.

In an embodiment, reflective surfaces 212a-212b are formed into or serve as the walls of housing 102. In another embodiment, reflective surfaces 212a-212b can fully or partially cover the inside walls of housing 102. In an embodiment, if reflective surfaces 212a-212b are mirrors, the thickness can approximate 0.35 cm. However, since a mirror is reflective only on its back side, the reflection of the electromagnetic radiation inside the cavity of chamber 100 should not be seriously altered due to the thickness of reflective surfaces 212a-212b. For example, if the length of the resonate cavity within chamber 100 is 13.8 cm. Having a mirror on both ends would decrease the actual length by "0.35 cm×2," or 0.70 cm. Thus the length, adjusted for the mirrors, is 13.1 cm. However, since the mirrored surface is only on the back of a mirror, the actual reflection of electromagnetic radiation should still be reflected within a 13.8 cm cavity, so long as the radiation can freely pass through the glass structure of the mirror.

Figure 3:
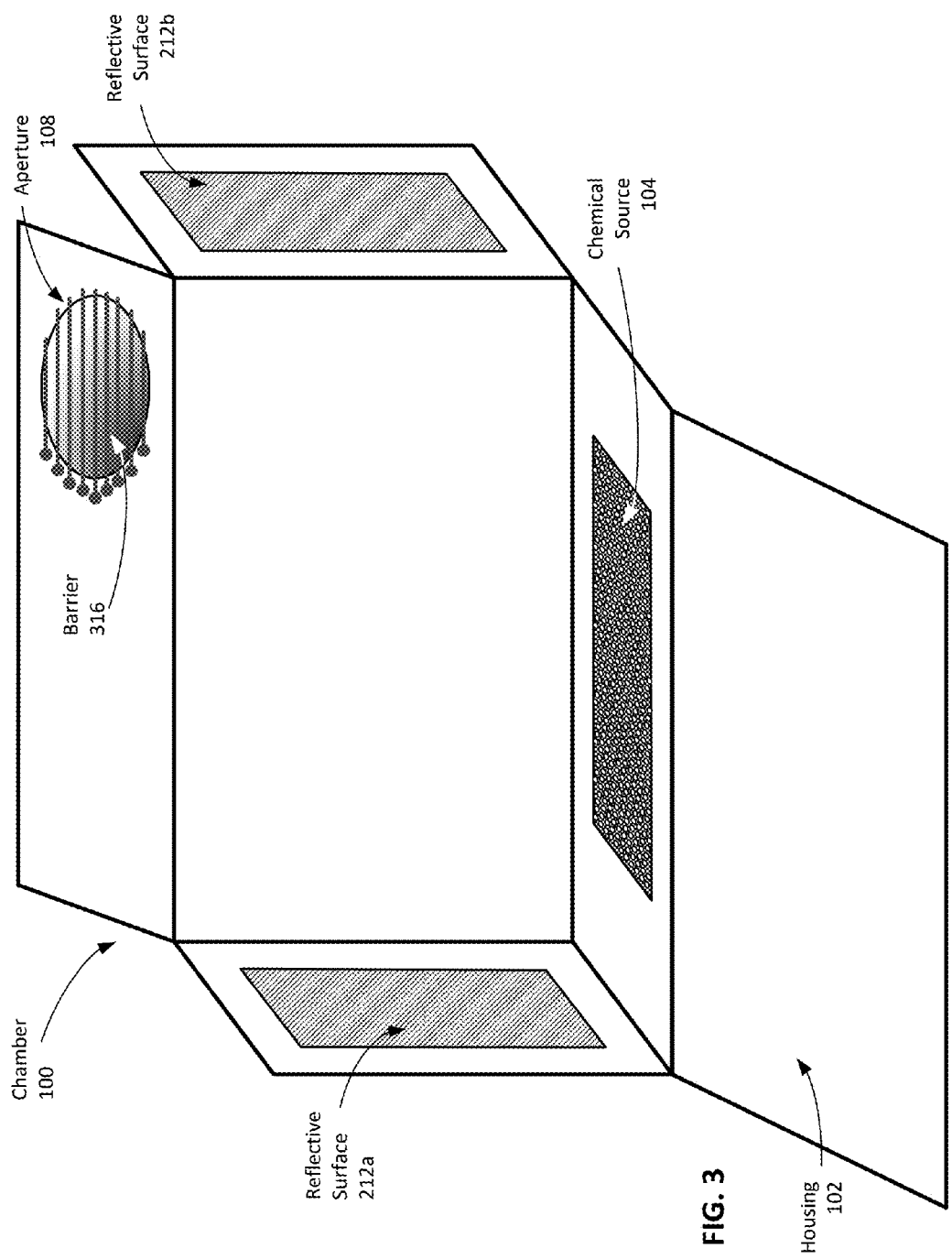
FIG. 3 illustrates an exploded view of the chamber of FIG. 2.

FIG. 3 shows an exploded view of chamber 100 of FIG. 2. FIG. 3 also shows an embodiment of a permeable barrier 316 for aperture 108. Barrier 316 is attached or formed to the inside of chamber 100, and covers aperture 108. Nonetheless, barrier 316 is sufficiently permeable to allow the control signal to escape. In an embodiment, barrier 316 is also configured to permit a target pest to enter aperture 108, but prevent the target pest from escaping. For example aperture 108 is sized to permit an insect, such as a moth, to enter chamber 100. After entering chamber 100, barrier 316 is structured to prevent the moth from escaping. Aperture 108 should be sufficiently unobstructed from both sides to allow the pest to enter chamber 100.

In an embodiment, barrier 316 is a series of four to six brush-like bristles that are attached to the inside of the top wall of housing 102. The bristles completely span aperture 108, and slightly overlap the opposite side. All bristles are attached at the same end, but left free to move at the opposite end. This allows the bristles to bend inwards, but not outwards because they are obstructed by the top wall of housing 102. Bristles are resilient to return to their natural positions after bending inwards.

In another embodiment, the bristles are attached at different ends as opposed to being attached at the same end. Alternatively, the bristles can be attached at both ends. Other configurations can be used so long as the target pest is allowed to enter chamber 100, but prevented from escaping.

In an embodiment, aperture 108 is one-quarter inch in diameter and has at least four brush-like bristles, all equally spaced, spanning the hole. The length of the bristles averages 1.5 centimeters or three-quarters of an inch so as to allow them to bend slightly. The bristles should be reasonably thick, much thicker than a human hair, for purposes of durability and to prevent escape of the pest, such as a moth.

Another embodiment of barrier 316 is a resilient flap or like structure that permits a pest to enter chamber 100. However, the flap must return to its original position to block the pest from exiting. In an embodiment, the flap may be attached to a springing mechanism that causes the flap to return to its original position. As discussed, the flap must be sufficiently permeable to permit the electromagnetic radiation and/or target lure to escape.

In an embodiment, multiple apertures 108 are strategically formed into housing 102. Each aperture 108 is configured to release a control signal and/or allow a target pest to enter, but not escape. In another embodiment, chamber 100 has at least two differently configured apertures 108. A first aperture 108 is configured to release the control signal, but is sized or has a permeable barrier to prevent a pest from entering or escaping. A second aperture 108 is provided to allow entry by the target pest. A permeable barrier 316 is integrated with the second aperture 108 to provide one-way entry.

Figure 4:
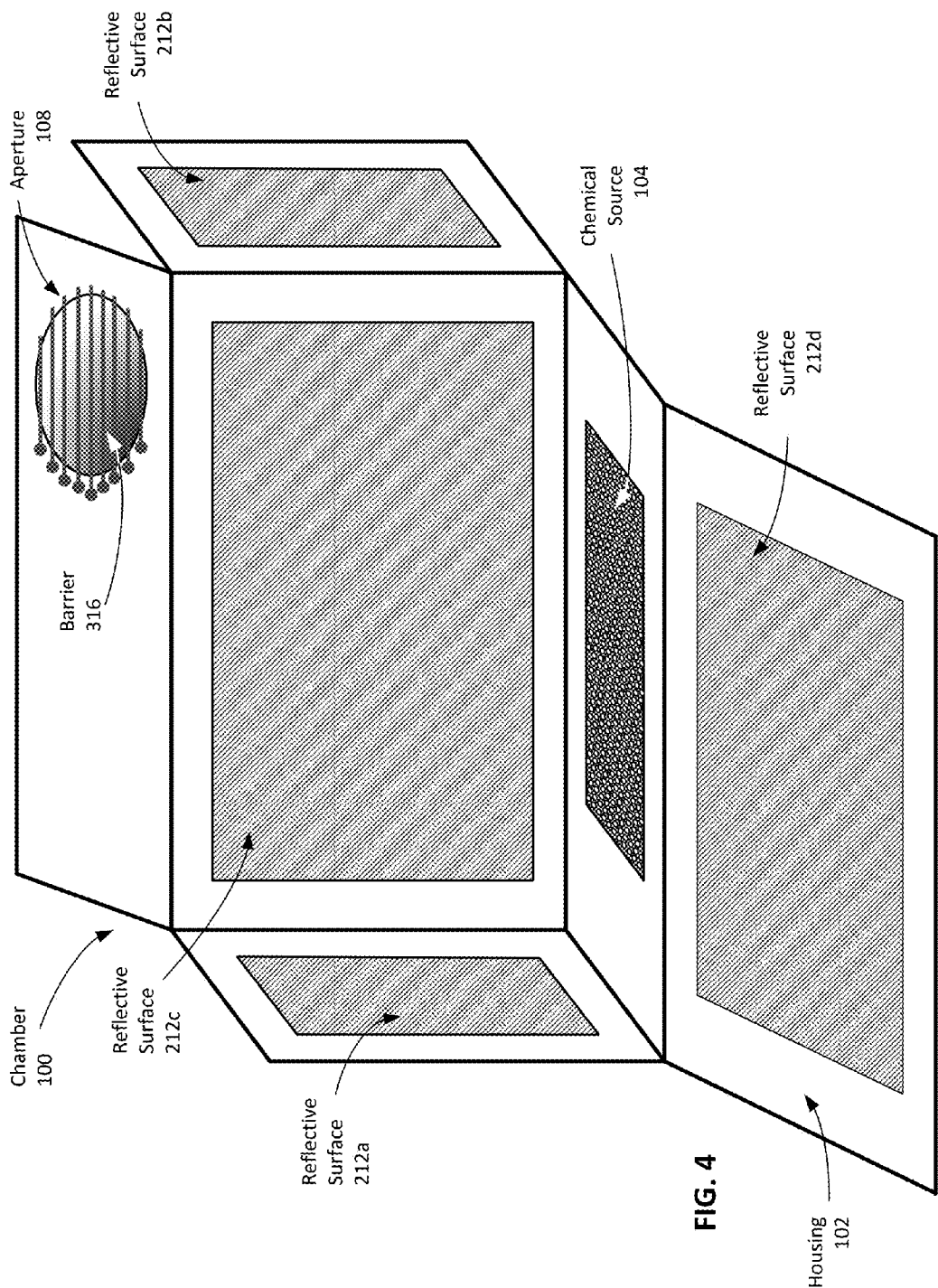
FIG. 4 illustrates an exploded view of a pest control chamber according to another embodiment of the present invention.

FIG. 4 shows another embodiment of chamber 100 having two sets of parallel reflective surfaces 212a-212b and 212c-212d. Reflective surfaces 212c-212d can partially or fully cover the inside of chamber 100 or actually form the walls of housing 102.

Figure 5:
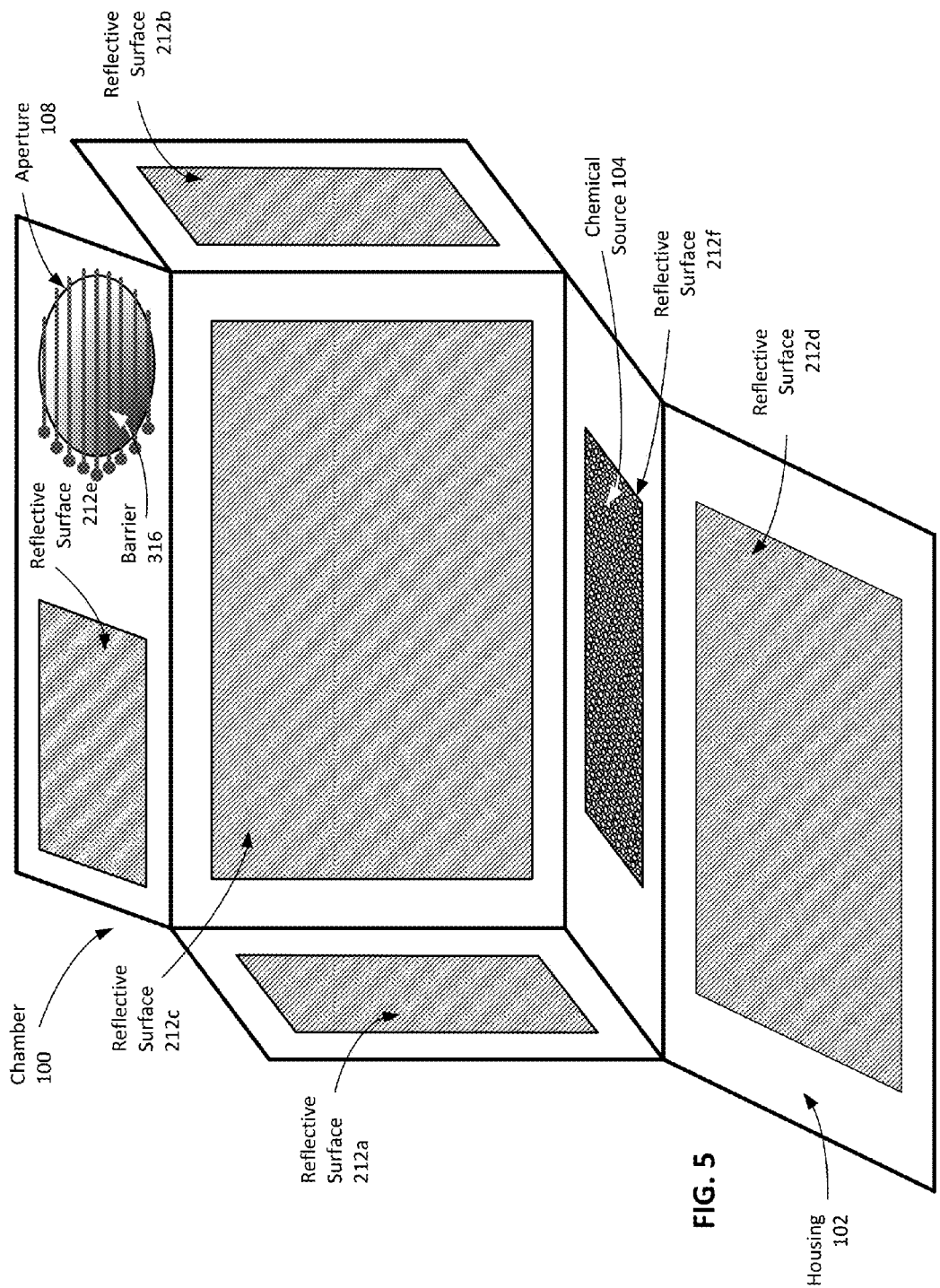
FIG. 5 illustrates an exploded view of a pest control chamber according to another embodiment of the present invention.

FIG. 5 shows another embodiment of chamber 100 with a reflective surface 212e positioned on the top of housing 102. Reflective surface 212e can fully or partially cover the top or actually be provided as the top of housing 102. Similarly, reflective surface 212f is provided on the bottom of housing 102. In an embodiment, reflective surface 212f is either applied to or formed as the bottom of housing 102. In another embodiment, as shown, reflective surface 212f is the base of chemical source 104, whereby the semiochemical is deposited directly onto reflective surface 212f. In yet another embodiment, reflective surface 212e can be provided in absence of reflective surface 212f, and vice versa. Accordingly, the inside walls of chamber 100 of the present invention can be partially or fully covered with reflective surfaces 212a-212f, or can be composed of reflective surfaces 212a-212f.

The method and system of the present invention amplifies desired frequencies similar to laser technology. However, the present invention differs from a conventional laser in that a pumping frequency is not necessary to produce amplification. The present invention also is distinguishable over conventional laser systems by the means in which coherent frequencies escape from the system of the present invention. Unlike conventional laser systems, the present invention does not use half-silvered reflective plates or transparent walls that allows coherent frequencies to escape. Instead, the resonating mechanisms and/or the walls of housing 102 do not permit the control signal to escape, rather the control signal emanates from aperture 108.

Although a pumping frequency is not necessary to attain the desired amplification level, a pumping source can be integrated with the present invention to provide certain operational advantages. Specifically, a pumping source can be integrated within chamber 100 to assist the amplification process or provide an additional attractant or repellant, as required.

Since the present invention is premised on achieving passive amplification and passive diffusion, the semiochemical must be allowed to resonate within chamber 100 for a certain incubation period. In an embodiment, pumping radiation is used to assist the amplification of stimulated emissions to reduce the incubation period.

In another embodiment, pumping radiation is provided as an additional attractant or repellant that serves to enhance the efficacy of chamber 100. The pumping radiation can include the same or other electromagnetic radiation of the electromagnetic spectrum, including, without limitation, microwaves, infrared and ultraviolet light. For example, the pumping radiation can be the same frequency as, for example, the wing beat of a moth (i.e., 30 to 70 Hz) or a fly (i.e., up to 500 Hz).

In an embodiment, pumping radiation can be provided by a black light, or incandescent or fluorescent lighting. Some species of ants have been determined to be able to distinguish between AC and DC sources. As such, an AC or DC electrical and/or electromagnetic source can be another source of pumping radiation. This phenomenon is described in "Effect of electrical fields on the red imported fire ant (Hymenoptera: Formicidae)," Environ. Entomol. 21(4):866-870, by Mackay, W. P., B. Vinson, J. Irving, S. Majdi, and C. Messer (1992).

A microchip can also be integrated with the present invention to regulate an emitter to a desired pumping radiation frequency. The proximity of power sources (such as the power source to the microchip) can also affect the efficacy of chamber 100. It has been discovered that some insects are attracted to power sources. Additionally, pumping radiation can come from sound waves, including ultrasonic waves.

A burning candle can also be used as a source of pumping radiation. A burning candle emits hydrocarbons which are the backbone structures of virtually all insect semiochemicals. Thus, the release of hydrocarbons near, or inside, chamber 100 can serve as a pumping radiation source. If the candle flickers at a certain frequency, it can serve as an attractant or repellant, depending on the pest.

Some colors, such as blue or red, have proven to provide pumping radiation that attracts certain insects. Therefore, housing 102 can be lined with a cloth or sticky substance of certain colors to providing a source of pumping radiation.

As discussed, the pumping radiation source can be located inside or outside of chamber 100. Moreover, the outside surface of housing 102 can be left bare or covered with any material or combination of materials. There can be one or more sticky surfaces placed on the outside of housing 102. A sticky substance can be used to completely cover all outside surfaces, but would make chamber 100 difficult to handle. However, placement at strategic locations outside of housing 102 may decrease the number of pests that enter the trap, and would allow the inside of housing 102 (especially the reflective surfaces 212a-212e) to remain cleaner longer. This would allow chamber 100 to last longer in the field between cleaning exercises.

In an embodiment, a sticky substance can be disposed inside of chamber 100. This would enable chamber 100 to be used without a barrier 316 that prevents the pests from exiting. In an embodiment, aperture 108 is only designed to allow the control signal to escape. Pests could enter chamber 100 through aperture 108 or a similar opening, and be trapped by the sticky substance.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above described exemplary embodiments, but should be defined only in accordance with the following claims and their equivalents.

What is claimed is:

1. An insect trap, comprising:
   a container including solid walls defining a closed space and devoid of any light source contained therein, wherein said container has an aperture, wherein at least two of said walls are at least partially covered with a mirror on the inside of said container, and a semiochemical attractant or repellant; and
   a permeable barrier that spans across said aperture, and wherein said permeable barrier is configured to permit at least one pest to enter said container;
   whereby said semiochemical attractant or repellant is dispersed via said aperture and said permeable barrier.

2. The trap of claim 1, wherein said at least two of said walls are parallel to one another.

3. The trap of claim 1, wherein said semiochemical attractant or repellant is deposited onto a substrate.

4. The trap of claim 1, wherein said semiochemical attractant or repellant is deposited onto said mirror.

5. The trap of claim 1, wherein said permeable barrier includes a resilient flap or a springing mechanism configured to return the permeable barrier to its original position after entry of the pest.

6. The trap of claim 1, wherein said permeable barrier is configured to prevent the pest from exiting said container upon entering said container.

7. The trap of claim 1, wherein said container comprises at least one of wood, plastic, cardboard, granite, metal, or glass.

8. The trap of claim 1, wherein said container has a rectangular shape.

9. The trap of claim 1, wherein said aperture is a circle with a one-quarter inch diameter.

10. The trap of claim 1, wherein said permeable barrier includes a plurality of flexible bristles, each of said flexible bristles being formed in or attached to said container and spanning across said aperture.

11. The trap of claim 10, wherein both ends of said plurality of flexible bristles are permanently attached.

12. The trap of claim 1, wherein said mirror completely covers the inside of said container.

13. The trap of claim 1, further comprising a light source situated external to said container.

14. The trap of claim 1, wherein said container further includes at least one sticky surface placed on the outer surface of said container.

15. The trap of claim 1, wherein said container further includes at least one sticky surface situated inside of said container.

16. The trap of claim 15, wherein the sticky surface is the color red.

17. The trap of claim 1, further comprising a device that can produce an electrical field within the container.

18. The trap of claim 1, further comprising a device that can produce sound waves at a specified frequency.

19. The trap of claim 1, wherein said permeable barrier is attached to said container.

20. An insect trap, comprising:
   a container including solid walls defining a closed space and devoid of any light source contained therein, wherein said container has an aperture, wherein at least two of said walls are at least partially covered with a mirror on the inside of said container;
   a permeable barrier that spans across said aperture, and wherein said permeable barrier is configured to permit at least one pest to enter said container; and
   a unit external to said container, wherein said unit and said container are connected via a vent formed in said container, wherein a semiochemical attractant or repellant is situated in said unit, whereby said semiochemical attractant or repellant is dispersed via said aperture and said permeable barrier.

\* \* \* \*